Sept. 27, 1955 C. ELSENER 2,718,695
POCKET KNIFE
Filed Nov. 8, 1952
FIG. 2
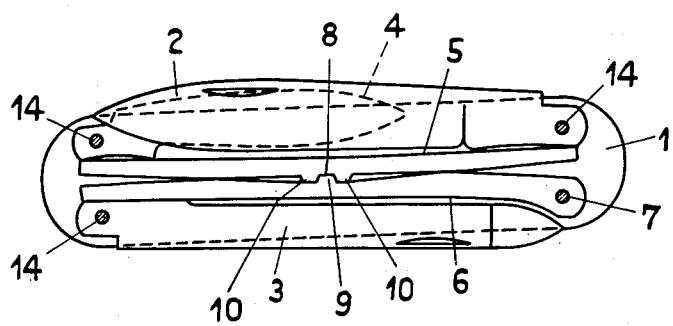
FIG. 1
Inventor:
Carl Elsener,
by Singer, Stern & Carlberg,
Attorneys.

United States Patent Office 2,718,695
Patented Sept. 27, 1955

2,718,695
POCKET KNIFE

Carl Elsener, Ibach-Schwyz, Switzerland

Application November 8, 1952, Serial No. 319,517

Claims priority, application Germany July 17, 1952

2 Claims. (Cl. 30—152)

The present invention relates to a pocket knife the blades of which are arranged in two tiers and pivoted to a pair of shells to be swung out on opposite sides thereof and are, within the range of their pivot points, under the action of spring bars.

From known pocket knives the knife according to the present invention distinguishes itself thereby that of the two spring bars extending longitudinally in the middle between the shells of the knife one only is pivoted tiltably at one end, while the other bar is rocking freely and secured merely by the meshing of gear teeth to the said first mentioned bar.

This and other features of the invention will become clear from the following description of an embodiment of the invention given by way of example with reference to the accompanying drawing, wherein Figure 1 is a top edge elevational view of the knife embodying the present invention, and Figure 2 is a longitudinal cross-sectional view taken on line 2—2 of Figure 1 and looking in the direction of the arrows to illustrate various details of construction.

In the drawing, one of the two shells of the pocket knife is denoted 1. Between these shells there are pivoted a number of implements e. g. a blade 2, a nail file 3, an eraser 4, or the like such as scissors etc. on rivets 14 in two tiers in the usual manner. Between the implements 2, 3 and 4, spring bars 5, 6 are arranged which tend in the usual way to secure the blade 2 and like implements both in the closed and in the opened position, by acting on them in the range of their pivot points 14. As will be seen from the drawing, the spring bar 6 only is tiltable about a rivet 7, while its other end is free. The spring bar 5, on the other hand, is arranged freely rocking and without any attachment by rivets, and merely engages the spring bar 6 by the meshing of the interstice 8 between its gear teeth 10 with a tooth 9 of the spring bar 6.

The embodiment described has the advantage over the constructions known hitherto that in the middle portion of the knife no rivet is provided, and that the four rivets are symmetrically disposed on the four corners of the knife, without requiring an expensive forked spring therefor.

While I have described and illustrated what may be considered a typical and particularly useful embodiment of my said invention, I wish it to be understood that I do not limit myself to the particular details and dimensions described and illustrated, for obvious modifications will occur to a person skilled in the art.

What I claim as my invention and desire to secure by Letters Patent, is:

1. In a pocket knife, a frame having two opposite longitudinal edges, implements pivotally mounted in said frame at both said edges to be turned on their pivots between an idle and an operative position, a pair of spring bars extending longitudinally of said frame between said implements and engaging said implements adjacent said pivots to yieldingly retain said implements in said idle position and in said operative position, means pivotally securing one of said spring bars at one end thereof to said frame, and interengaging tooth means intermediate the ends of said pair of spring bars 4 pivotally connecting the other spring bar to said first mentioned spring bar.

2. A pocket knife as in claim 1, in which said tooth means comprise a single tooth on one of said spring bars engaging between two teeth on the other spring bar.

References Cited in the file of this patent
UNITED STATES PATENTS

| | | |
|---|---|---|
| 48,685 | Heninger | July 11, 1865 |
| 75,955 | Mosley | Mar. 24, 1868 |
| 563,305 | Paffrath | July 7, 1896 |
| 573,475 | Muller | Dec. 22, 1896 |
| 613,698 | Martin | Nov. 8, 1898 |
| 970,517 | Lockhart | Sept. 20, 1910 |
| 1,828,121 | Adam et al. | Oct. 20, 1931 |